(12) United States Patent
Rao et al.

(10) Patent No.: US 12,519,296 B2
(45) Date of Patent: Jan. 6, 2026

(54) ELECTRICAL JUNCTION BOX ASSEMBLY

(71) Applicant: Appleton Grp LLC, Rosemont, IL (US)

(72) Inventors: Mukunda Rao, Pune (IN); William Leber, Chicago, IL (US); Shriram Divekar, Pune (IN); Gavin Hamilton, Chicago, IL (US); Amit Kulkarni, Pune (IN)

( * ) Notice: Subject to any disclaimer, the term of this patent is extended or adjusted under 35 U.S.C. 154(b) by 3 days.

(21) Appl. No.: 17/685,787

(22) Filed: Mar. 3, 2022

(65) Prior Publication Data
US 2022/0285925 A1    Sep. 8, 2022

(30) Foreign Application Priority Data
Mar. 4, 2021 (IN) .............................. 202121009111

(51) Int. Cl.
*H02G 3/08* (2006.01)
(52) U.S. Cl.
CPC .................................. *H02G 3/088* (2013.01)
(58) Field of Classification Search
CPC .......... H02G 3/08; H02G 3/081; H02G 3/088; H02G 3/085; H02G 3/10; H02G 3/12; H02G 3/14; H02G 3/16; H05K 5/00; H05K 5/02; H05K 5/0214; H05K 5/0217; H05K 5/0247; H05K 5/03; H01R 13/46; H01R 13/52
USPC ......... 174/50, 480, 481, 487, 482, 483, 484, 174/490, 53, 58; 220/3.2–3.9, 4.02; 248/906, 343, 68.1, 49
See application file for complete search history.

(56) References Cited

U.S. PATENT DOCUMENTS

| | | | |
|---|---|---|---|
| 2,538,088 A | 1/1951 | Desloge | |
| 2,835,722 A | 5/1958 | Appleton | |
| 3,430,799 A | 3/1969 | Maier | |
| 5,382,752 A | 1/1995 | Reyhan et al. | |
| 5,783,774 A * | 7/1998 | Bowman | H02G 3/185 174/487 |
| 6,727,429 B1 * | 4/2004 | Koessler | H02G 3/088 174/67 |
| 6,733,345 B2 * | 5/2004 | Weise | H01R 9/24 439/721 |

(Continued)

FOREIGN PATENT DOCUMENTS

CN    10159395    12/2009

OTHER PUBLICATIONS

Appleton Catalog, Conduit Outlet Boxes and Bodies: Malleable iron or Aluminum; Explosionproof, Dust-Ignitionproof UNILETS for use with Threaded Metal Conduit, Sep. 2005, 4 pages.

(Continued)

*Primary Examiner* — Angel R Estrada
(74) *Attorney, Agent, or Firm* — McDonnell Boehnen Hulbert & Berghoff LLP; Nicole E. Reifman (57) ABSTRACT

The present disclosure relates to and envisages an electrical junction box assembly. The electrical junction box assembly (10) comprises a housing (100) having lateral openings (120) and a lid (130). In one aspect, the housing (100) has mounting feet (140) with at least one of them having a slit (144). In another aspect, the base (110) has bosses (150) for fixing a terminal block (200). In yet another aspect, the housing (100) is provided with an external drainage protrusion (160) configured to be sheared off to provide a drainage hole. In still another aspect, the lid (130) is captively joined to the rest of said housing (100).

9 Claims, 14 Drawing Sheets

(56) References Cited

U.S. PATENT DOCUMENTS

| | | | | |
|---|---|---|---|---|
| 7,122,743 | B2* | 10/2006 | Babiarz | H02G 3/088 174/101 |
| 7,427,714 | B1* | 9/2008 | Lammens, Jr. | H02G 9/02 174/67 |
| 7,432,439 | B2* | 10/2008 | Takada | H01R 9/2425 174/64 |
| 7,504,580 | B2* | 3/2009 | Lammens, Jr. | H02G 3/14 439/535 |
| 8,040,678 | B2* | 10/2011 | Tai | H01R 4/48185 361/752 |
| 8,157,116 | B2* | 4/2012 | Ejima | B60R 16/0238 174/58 |
| 8,172,589 | B2 | 5/2012 | Johnson et al. | |
| 8,273,998 | B2* | 9/2012 | Drane | H02G 3/185 52/220.8 |
| 8,378,232 | B2* | 2/2013 | Drane | H02G 3/383 174/559 |
| 8,921,712 | B1* | 12/2014 | Gretz | H02G 3/04 174/487 |
| 10,090,655 | B1* | 10/2018 | Luna | H02G 3/083 |

OTHER PUBLICATIONS

Hubbell Killark Catalog, Installation, Operation & Maintenance Data Sheet, Jan. 2014, 2 pages.

Appleton Catalog, GR and GRF Conduit Outlet Boxes, Explosionproof, Dust-Ignitionproof, UNILETS for use with Threaded Metal Conduit, Furnished with Internal Ground Screw and O-ring, Sep. 2020, 5 pages.

Eaton Crouse—Hinds Series, Condulet EAJ Series, Conduit Outlet Boxes with Covers, 2016, 2 pages.

CSA International, Certificate of Compliance, Sep. 21, 2006, 2 pages.

Indian Examination Report dated Oct. 3, 2022 for Indian Application No. 202121009111 , 7 pages.

* cited by examiner

ELECTRICAL JUNCTION BOX ASSEMBLY

FIELD

The present disclosure relates to electrical junction box assemblies.

BACKGROUND

The background information herein below relates to the present disclosure but is not necessarily prior art.

An electrical junction box is an enclosure for electrical wire junctions. The junction box has a plurality of openings for the wires to be inserted in and form junctions inside the enclosure. The openings are often coupled with conduits containing wires. Junction boxes provide ingress protection and may support wall mounting, mounting within a ceiling or a floor or an accessible panel.

Junction boxes that are required for mounting on high walls or other inaccessible or inconvenient locations may require a highly skilled operator for mounting. The holes or similar apertures made in the walls for receiving fasteners for mounting the junction boxes may not always match the dimensions and/or the distances between the locations of the fasteners on the boxes. Hence, additional drilling for making new holes may be required, which increases installation time and difficulty, particularly in inaccessible locations. Certain types of junction boxes need clamps for mounting and are suspended directly on conduit entries. A feature that makes junction box installation more convenient and independent of dimensional variations is, therefore, required.

When an operator or maintenance personnel is working on the junction inside a junction box that is fitted on an inaccessible location such as a high wall, the lid of the junction box may require careful handling to prevent falling of the lid from the height. Thus, a junction box assembly is required which is hassle-free in handling.

A junction boxer usually encloses and holds an electrical terminal block that provides a plurality of electrical terminals for coupling together two or more wires. Depending upon the external layout of wires, the terminal blocks, which are usually elongate rectangular in shape, may need to be fixed in various orientations inside the junction box. An arrangement is required in the junction box assembly which allows mounting of a terminal box in different orientations.

Junction boxes are also expected to sustain various climactic conditions, if installed outdoors. Thus, accumulation of precipitation or due to condensation caused by temperature changes can occur regularly. This may necessitate regular maintenance activity of the junction box involving removal of the accumulated water. Thus, a solution is required for removal of any liquid accumulated in the junction box.

Thus, there is a need of an electrical junction box assembly, which ameliorates the aforementioned issues.

OBJECTS

Some of the objects of the present disclosure, which at least one embodiment herein satisfies, are as follows:

A primary object of the present disclosure is to provide an electrical junction box assembly.

Another object of the present disclosure is to provide an electrical junction box assembly, which provides ease of installation.

Yet another object of the present disclosure is to provide an electrical junction box assembly, which can accommodate variations in dimensions.

Still another object of the present disclosure is to provide an electrical junction box assembly, which has an arrangement which allows mounting of a terminal box in different orientations.

Yet another object of the present disclosure is to provide an electrical junction box assembly, which provides for removal of liquids accumulated within the box.

Still another object of the present disclosure is to provide an electrical junction box assembly, which provides ease of handling of the lid.

Other objects and advantages of the present disclosure will be more apparent from the following description, which is not intended to limit the scope of the present disclosure.

SUMMARY

The present disclosure envisages an electrical junction box assembly comprising a housing and a removable and detachable lid. The housing has a space for containing an electrical terminal block, a lateral surface surrounding the space, an operative top opening for placement and removal of the terminal block, a plurality of lateral openings on the lateral surface for allowing insertion of electrical wires to be connected to the terminal block, a base for fixing the terminal block. The removable and detachable lid covers the operative top opening of the housing.

According to a first aspect of the present disclosure, the housing has at least one pair of mounting feet. Each of the mounting feet extends from the periphery of the base external to the housing.

Alternatively, the housing has at least one pair of mounting feet that extend from the periphery of the base external to the housing. Characteristically, each of the mounting feet has a slit. Each of the slits is configured to receive fasteners for fixing the junction box assembly.

The mounting feet of the pair of mounting feet extend along a plane parallel to the plane of the base. Preferably, the mounting feet are located on diagonally opposite positions of the base of the housing.

According to another aspect of the present disclosure, the operative inner surface of the base has a plurality of bosses. Each boss has an aperture. The apertures of the bosses are configured to receive fasteners for fixing the terminal block.

The base of the housing of the junction box assembly can have four or more bosses. The bosses are preferably provided in pairs, with each pair located on diagonally opposite positions of the base of the housing.

According to yet another aspect of the present disclosure, the lateral surface of the housing is provided with an external drainage protrusion configured to be ruptured to facilitate drainage of accumulated fluid within the space of the housing.

In an embodiment, the drainage protrusion has a thickness less than the radial width of the protrusion, thereby defining a concave operative inner profile of the drainage protrusion. Preferably, maximum thickness along the concave operative inner profile of the drainage protrusion is equal to the thickness of the lateral surface of the housing. The drainage protrusion is configured to be sheared off by drilling or tapping. In an embodiment, the junction box assembly includes a drainage valve configured to be fitted on the drainage hole obtained by shearing off the drainage protrusion by drilling or tapping.

According to yet another aspect of the present disclosure, the lid is captively joined to the rest of the housing. In a preferred embodiment, the junction box assembly of the present disclosure has a wire strand having one end fixed on the lid and the other end fixed on a point on the rest of the housing.

BRIEF DESCRIPTION OF THE ACCOMPANYING DRAWING

An electrical junction box assembly, of the present disclosure, will now be described with the help of the accompanying drawing, in which.

LIST OF REFERENCE NUMERALS

10 electrical junction box assembly
200 electrical terminal block
100 housing
120 lateral openings
110 base
130 lid
132 wire strand
134 sub-lid
136 lid seal
140 mounting feet
142 aperture
144 slit
150 boss
152 aperture
160 drainage protrusion
162 concave operative inner profile
164 drainage valve

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open ended transitional phrases and therefore specify the presence of stated features, elements, modules, units and/or components, but do not forbid the presence or addition of one or more other features, elements, components, and/or groups thereof.

The terms first, second, third, etc., should not be construed to limit the scope of the present disclosure as the aforementioned terms may be only used to distinguish one element, component or section from another component or section. Terms such as first, second, third etc., when used herein do not imply a specific sequence or order unless clearly suggested by the present disclosure.

A junction box is required whose installation is convenient and independent of dimensional variations, is hassle-free in handling, has an arrangement which allows mounting of a terminal box in the junction box in different orientations, and which is equipped for removal of any liquid accumulated in the junction box.

The present disclosure envisages an electrical junction box assembly 10 comprising a housing 100 and a removable and detachable lid 130. The housing 100 has a space for containing an electrical terminal block 200, a lateral surface surrounding the space, an operative top opening for placement and removal of the terminal block 200, a plurality of lateral openings 120 on the lateral surface for allowing insertion of electrical wires to be connected to the terminal block 200, and a base 110 for fixing the terminal block 200. The removable and detachable lid 130 covers the operative top opening of the housing 100.

Figure 1:
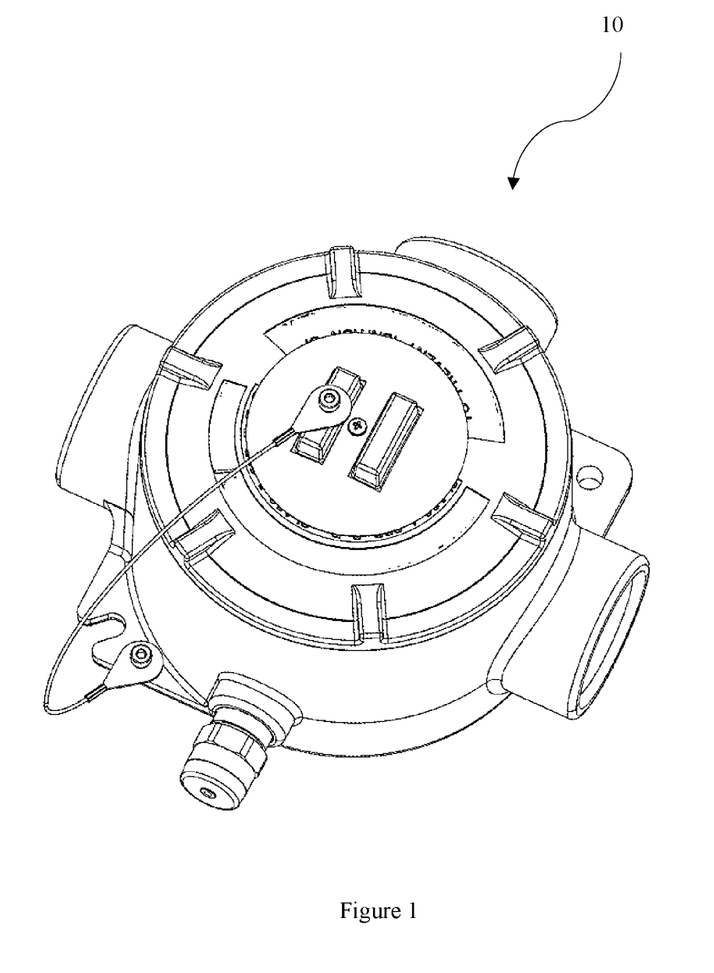
FIG. 1 illustrates an isometric view of the electrical junction box assembly of the present disclosure.
Figure 2:
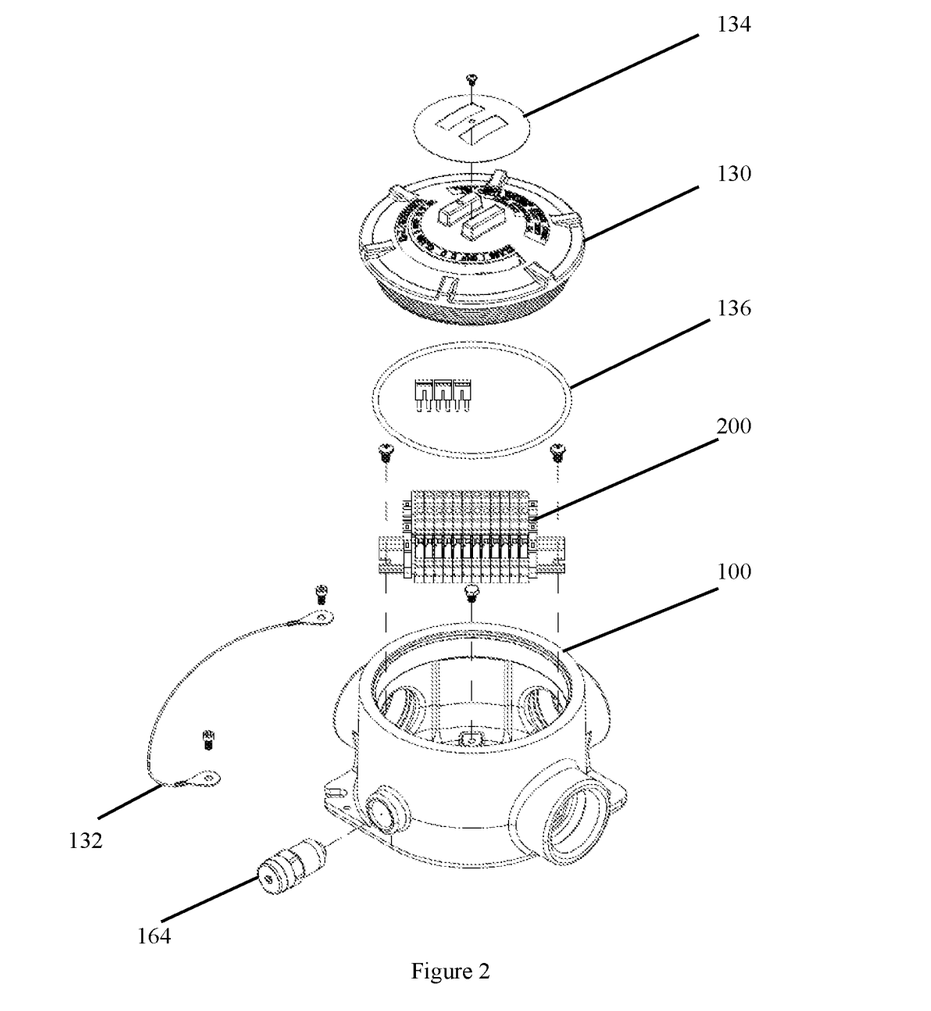
FIG. 2 illustrates an exploded view of the electrical junction box assembly of FIG. 1.
Figure 3A:
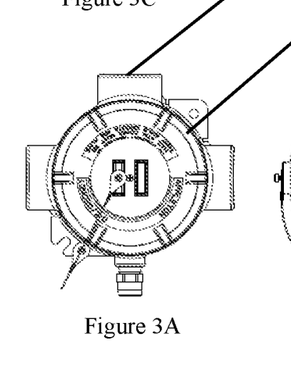
FIGS. 3A-3E illustrate a top view, a front view, a rear view, a left side view and a bottom view respectively of the electrical junction box assembly of FIG. 1.
Figure 3B:
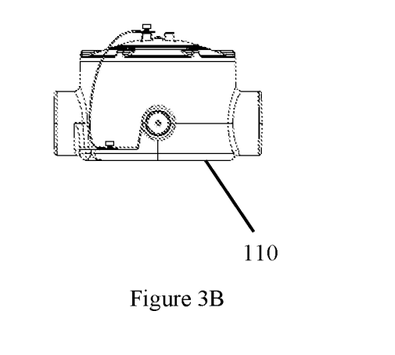
Figure 3C:
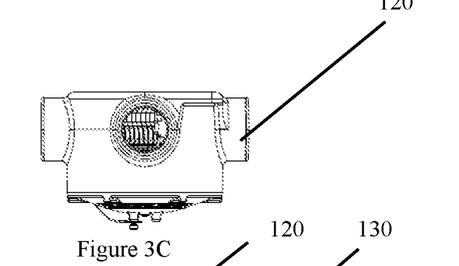
Figure 3D:
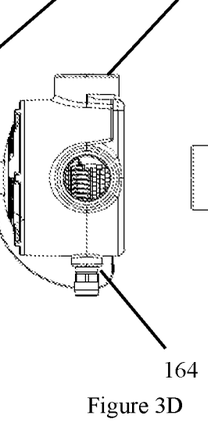
Figure 3E:
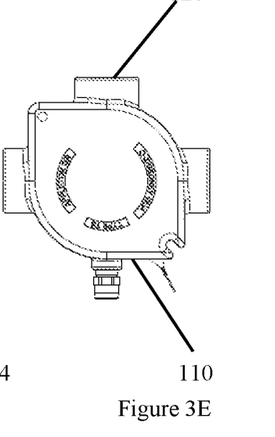

FIG. 1 illustrates an isometric view of the electrical junction box assembly 10 of the present disclosure. A predominantly circular cross-sectional shape of the junction box assembly 10 is illustrated in FIG. 1. However, a square, oblong, polygonal or any random cross-sectional shape of the junction box assembly 10 can be envisaged. FIG. 2 illustrates an exploded view of the electrical junction box assembly of FIG. 1, in which the housing 100 with the lid 130, wire strand 132, sub-lid 134, lid seal 136, terminal block 200 and drainage valve 164 are shown in a disassembled state. Various threaded fasteners, which are not specifically labelled or numbered, may be used for completing the assembly thus illustrated. FIGS. 3A-3E illustrate a top view, a front view, a rear view, a left side view and a bottom view respectively of the electrical junction box assembly of the present disclosure. The base 110, the lateral openings 120, the lid 130, the drainage valve 164 are highlighted. The lateral openings 120 preferably are provided with external extensions for coupling with conduits containing wires. The housing 100 is a component typically obtained by moulding followed by machining for the lateral openings 120 and other surfaces as required. However, a housing of sheet metal can also be envisaged. The terminal block 200 typically includes a series of wire connection terminals in pairs, wherein the terminals in a pair are electrically connected while being insulated from terminals in the remaining pairs.

Figure 4A:
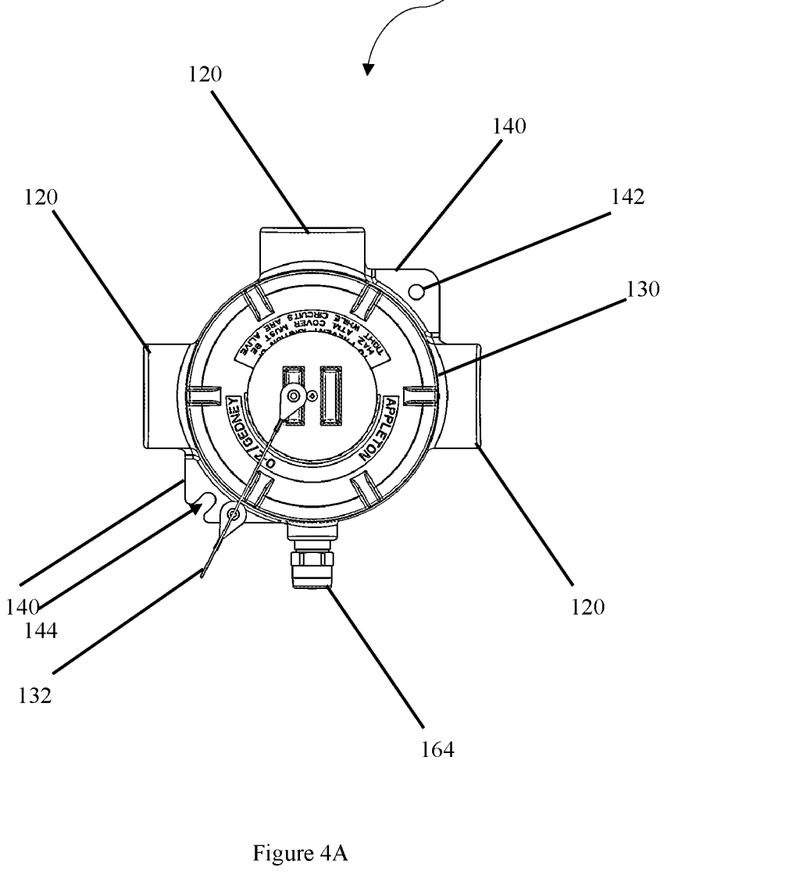
FIGS. 4A-4I illustrate various embodiments of the electrical junction box assembly of FIG. 1 with variation in the slit and hole types.
Figure 4B:
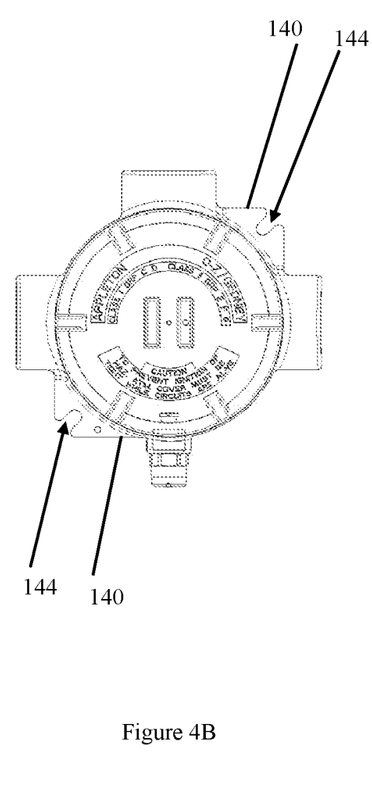
Figure 4C:
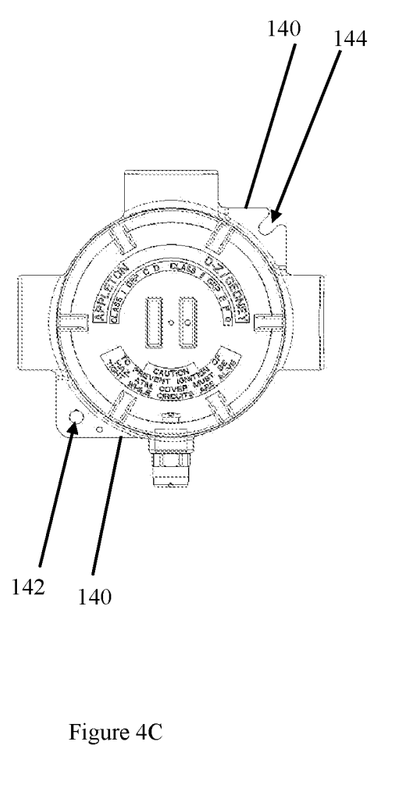
Figure 4D:
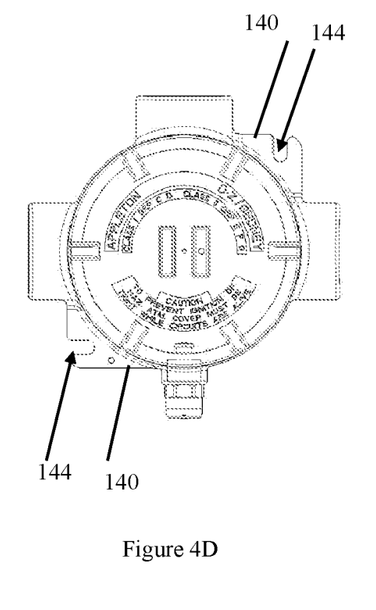
Figure 4E:
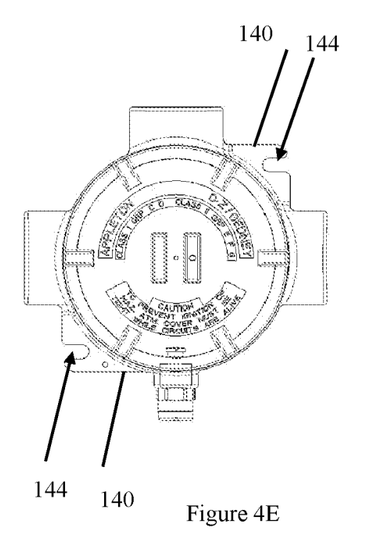
Figure 4F:
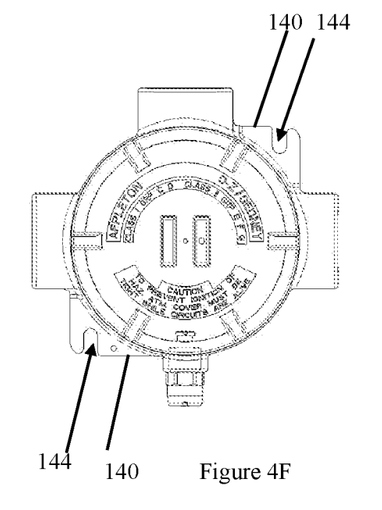
Figure 4G:
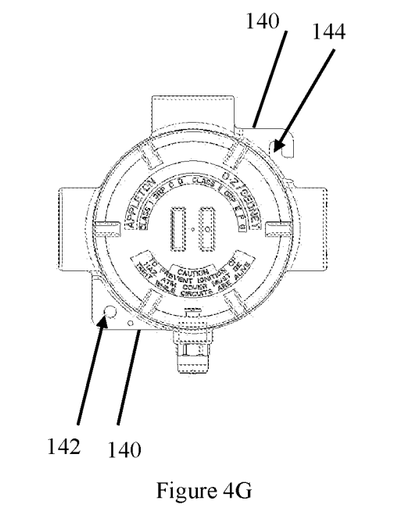
Figure 4H:
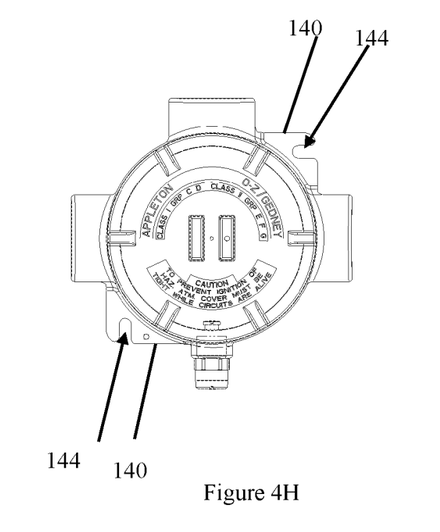

According to a first aspect of the present disclosure, the housing 100 has at least one pair of mounting feet 140. Each mounting feet 140 extend from the periphery of the base 110 external to the housing 100. One of the mounting feet 140 has an aperture 142 and the other of the mounting feet 140 has a slit 144. The hole or aperture 142 and the slit 144 are configured to receive fasteners for fixing the junction box assembly. This aspect is illustrated in FIGS. 4A, 4C and 4G.

For mounting the junction box assembly 10 on a supporting surface such as that of a wall or a ceiling etc., an aperture 142 of one of the mounting feet 140 is aligned with a hole in the supporting surface and a threaded fastener is inserted in the holes. Thereafter, the junction box assembly 10 is angularly displaced to align a slit 144 on another of the mounting feet 140 with another hole on the supporting surface. Hence, another threaded fastener is inserted in the holes through the slit 144. Thus, any variation in the distance between the holes in the supporting surface made for fixing the junction box assembly 10 can be accommodated within a predetermined limit, which may be less than or equal to the length of the slit 144.

Alternatively, the housing 100 has at least one pair of mounting feet 140. Each of the mounting feet 140 extends from the periphery of the base 110 external to the housing 100. Characteristically, each of the mounting feet 140 has a slit 144. Each of the slits 144 is configured to receive fasteners for fixing the junction box assembly. This aspect is illustrated in FIGS. 4B, 4D, 4E, 4F and 4H.

The mounting feet 140 of the pair of mounting feet 140 extend along a plane parallel to the plane of the base 110. Preferably, the mounting feet 140 are located on diagonally opposite positions of the base 110 of the housing 100.

Figure 4I:
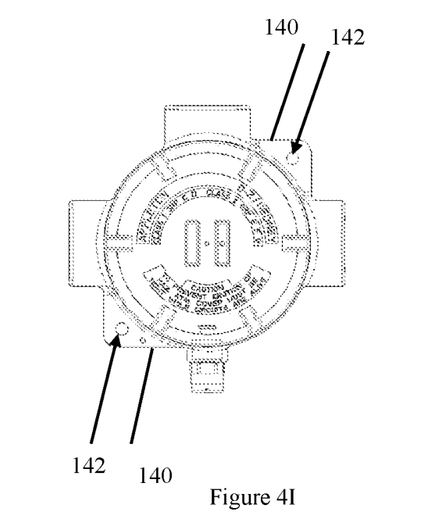

Besides, FIG. 4I illustrates an embodiment of the electrical junction box assembly 10 with holes 142 on two mounting feet 140.

According to another aspect of the present disclosure, the operative inner surface of the base 110 has a plurality of bosses 150. Each boss 150 has an aperture 152. The apertures 152 of the bosses 150 are configured to receive fasteners for fixing the terminal block 200.

The base of the housing 100 of the junction box assembly 10 can have four or more bosses 150. The bosses 150 are preferably provided in pairs, with each pair located on diagonally opposite positions of the base 110 of the housing 100.

Figure 5A:
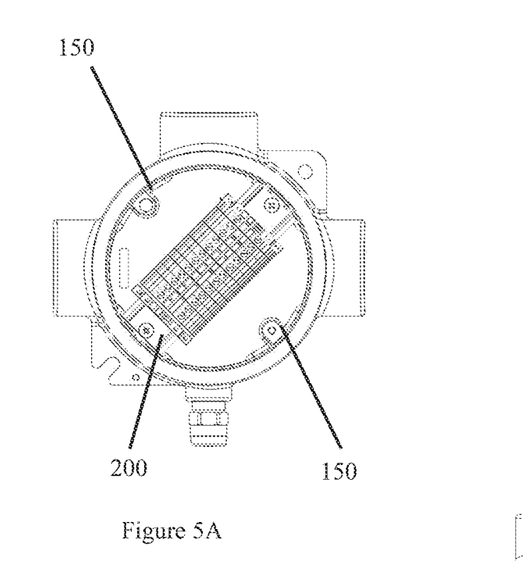
FIGS. 5A-5D illustrate various embodiments of the electrical junction box assembly of FIG. 1 with variation in the configurations of bosses.
Figure 5B:
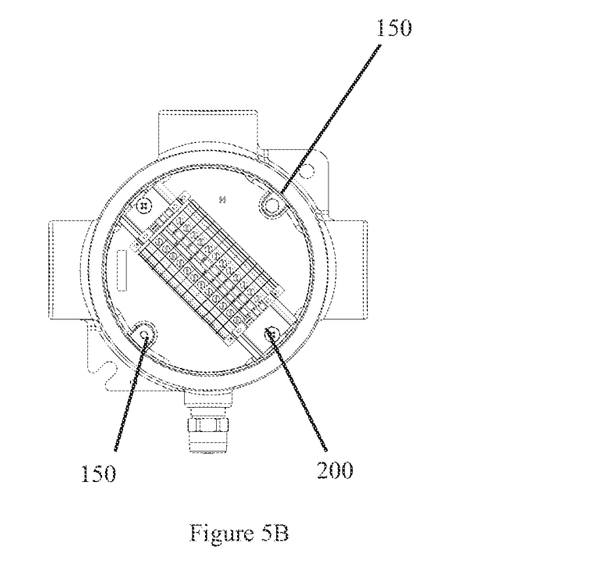
Figure 5C:
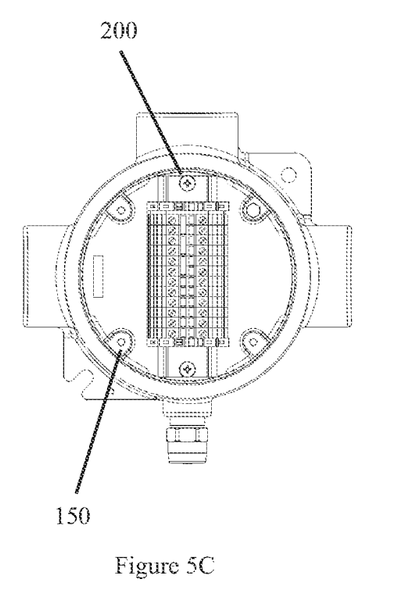
Figure 5D:
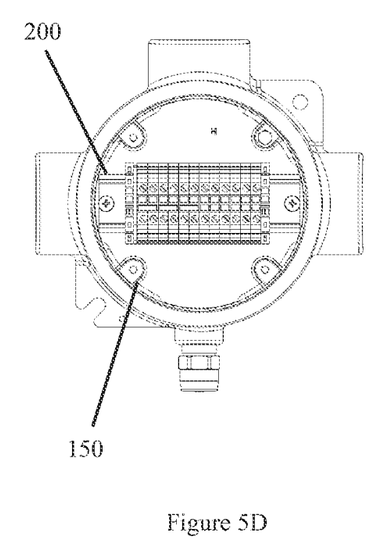

FIGS. 5A, 5B illustrate embodiments with four bosses 150 arranged in two pairs, 90° apart, while FIGS. 5C and 5D illustrate embodiments with six bosses 150 arranged in three pairs, 45° apart. The mounting of the terminal block 200 is possible in at least the orientations illustrated in FIGS. 5A-5D, although other orientations may be envisaged too.

Figure 6:
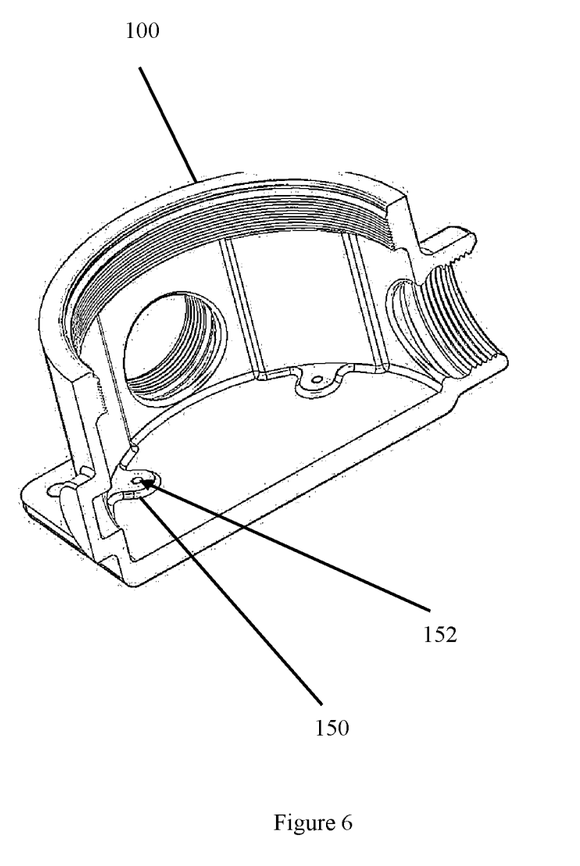
FIG. 6 shows a sectional isometric view of the housing of the junction box assembly of the present disclosure showing a boss provided therein.

FIG. 6 shows bosses 150 provided in a housing 100 of the junction box assembly. The bosses 150 are raised portions obtained during casting of the housing 100, and the holes 152 are machined at a later stage of manufacturing.

According to yet another aspect of the present disclosure, the lateral surface of the housing 100 is provided with an external drainage protrusion 160 configured to be ruptured to facilitate drainage of accumulated fluid within the space of the housing 100.

In an embodiment, the drainage protrusion 160 has a thickness less than the radial width of the protrusion, thereby defining a concave operative inner profile 162 of the drainage protrusion 160.

Preferably, maximum thickness along the concave operative inner profile 162 of the drainage protrusion 160 is equal to the thickness of the lateral surface of the housing 100. The drainage protrusion 160 is configured to be sheared off by drilling or tapping. In an embodiment, the junction box assembly 10 includes a drainage valve 164 configured to be fitted on the drainage hole obtained by shearing off the drainage protrusion 160 by drilling or tapping.

The current aspect provides for removal of liquids accumulated within the junction box assembly.

Figure 7A:
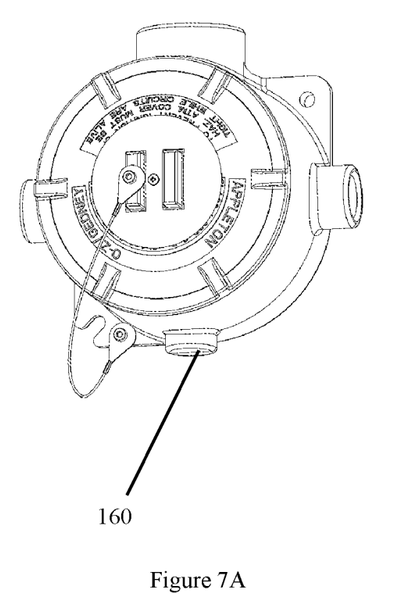
FIGS. 7A-7D illustrate the steps of fitment of the drainage valve over the drainage protrusion on the electrical junction box assembly of FIG. 1.
Figure 7B:
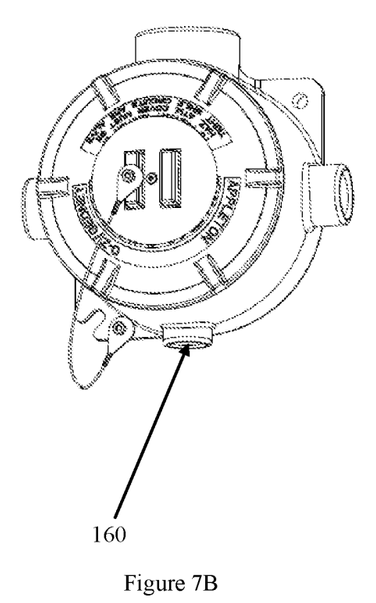
Figure 7C:
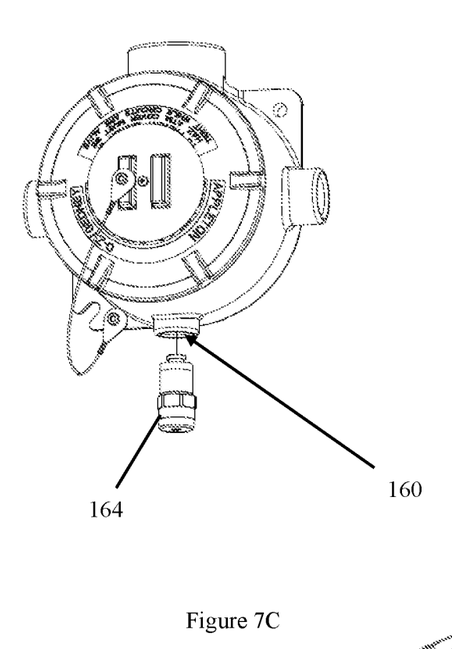
Figure 7D:
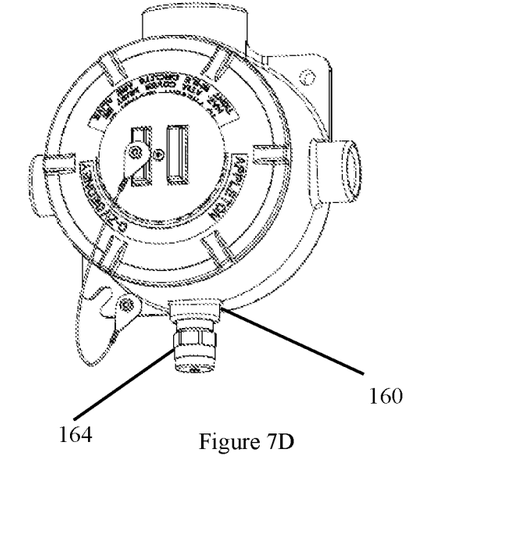

FIGS. 7A-7D illustrate the steps of fitment of the drainage valve over the drainage protrusion on the electrical junction box assembly 10. In FIG. 7A, the drainage protrusion 160 is visible in an unsheared state. In FIG. 7B, a drainage hole, obtained by shearing off a flat surface on the drainage protrusion 160 by drilling or tapping, is shown. FIG. 7C shows a drainage valve 164, which may be a one-way valve, aligned with the drainage hole in the drainage protrusion 160. FIG. 7D shows the drainage valve 164 fitted in the drainage hole in the drainage protrusion 160.

Figure 8A:
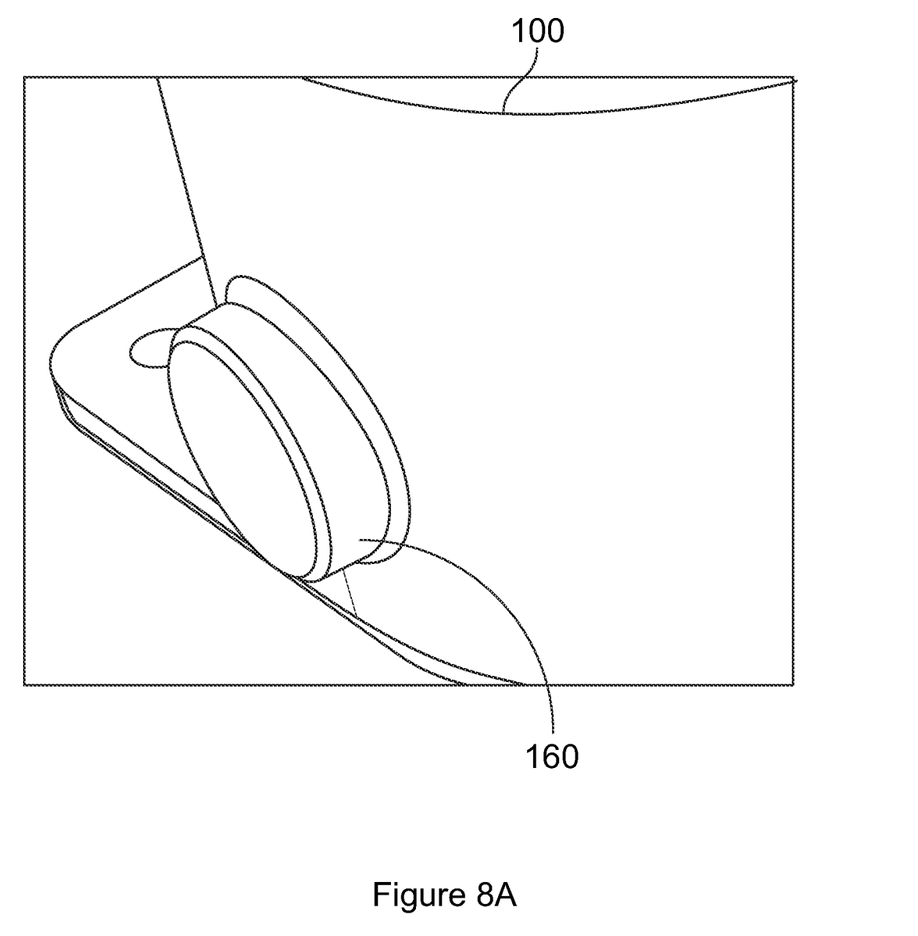
FIG. 8A shows a close-up view of the housing of the drainage protrusion of the junction box assembly of the present disclosure.
Figure 8B:
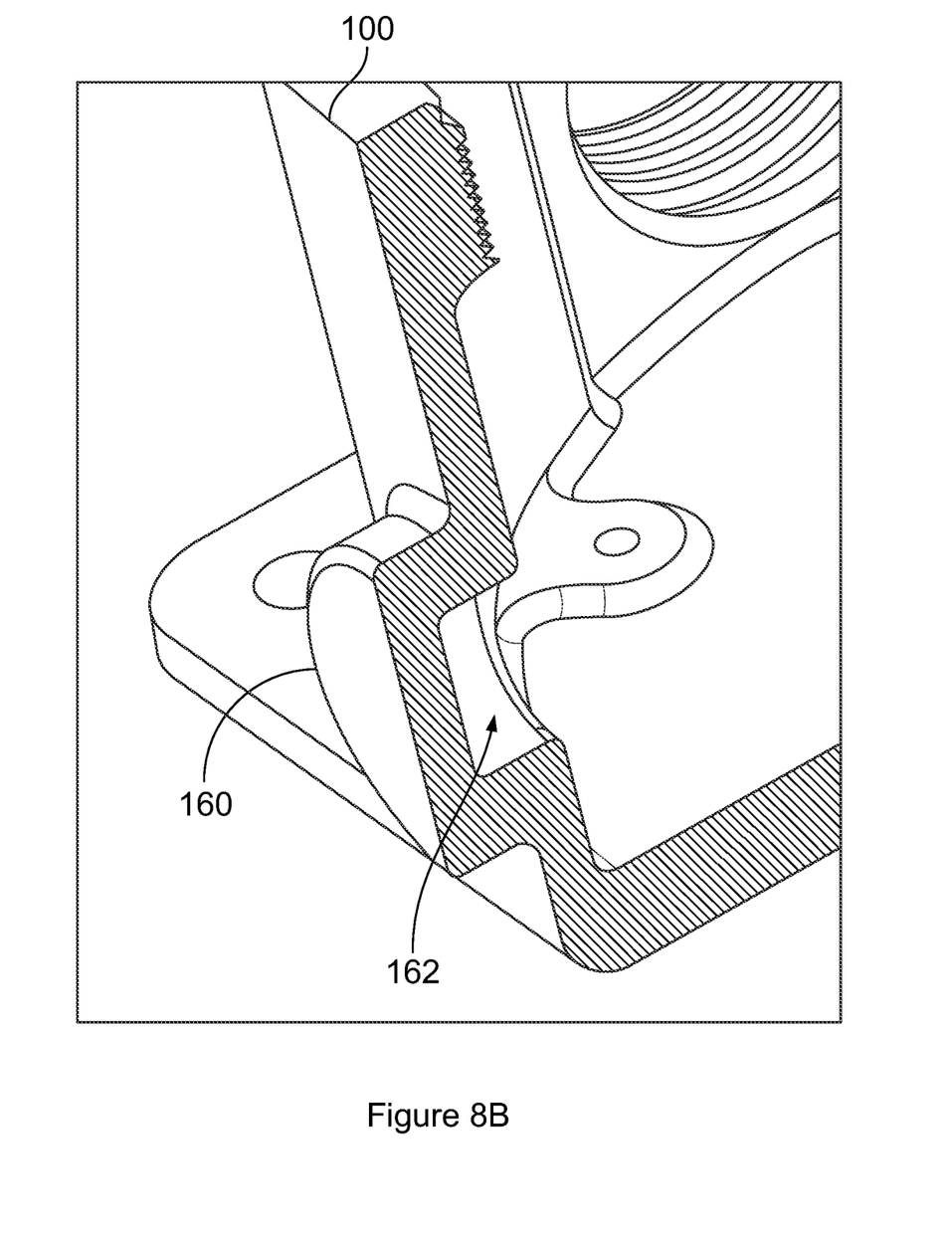
FIG. 8B shows a close-up sectional view of the drainage protrusion of FIG. 8A.

FIG. 8A shows a close-up view of the housing of the drainage protrusion with the drainage protrusion in an unsheared state. FIG. 8B shows a close-up sectional view of the drainage protrusion of FIG. 8A revealing the concave operative inner profile 162 of the drainage protrusion 160. The preferred relative thicknesses of the walls in the drainage protrusion 160 and in the rest of the housing 100 is thus illustrated in FIG. 8B.

According to yet another aspect of the present disclosure, the lid 130 is captively joined to the rest of the housing 100. In a preferred embodiment, the junction box assembly 10 of the present disclosure has a wire strand 132 having one end fixed on the lid 130 and the other end fixed on a point on the rest of the housing 100. As illustrated in FIG. 4A, for example, one of the mounting feet 140 may be provided with another hole for fixing the wire strand 132 and the other end of the wire strand 132 may be fixed on the sub-lid 134 of the lid 130. The current aspect, thus, provides ease of handling of the lid 130.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of an electrical junction box, that:

provides ease of installation;

can be accommodate variations in dimensions;

provides for removal of liquids accumulated within the junction box assembly; and provides ease of handling of the lid.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should be and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation

We claim:

1. An electrical junction box assembly (10) comprising:
a housing (100) having:
a space for containing an electrical terminal block (200);
a lateral surface surrounding said space;
an operative top opening for placement and removal of the terminal block (200);
a plurality of lateral openings (120) on said lateral surface for allowing insertion of electrical wires to be connected to said terminal block (200);
a base (110) providing a closed end to said lateral surface, wherein said base (110) is for fixing said terminal block (200); and
a removable and detachable lid (130) for covering said operative top opening of said housing (100);
characterized in that said housing (100) has at least one pair of mounting feet (140), each mounting foot of said pair of mounting feet (140) extending from the periphery of said base (110) external to said housing (100),
a first mounting foot of said pair of mounting feet (140) having an aperture (142), and
a second mounting foot of said pair of mounting feet (140) having a slit (144), said aperture (142) configured to receive a first fastener for precise placement on a surface of a fastener therein, and said slit (144) configured to receive a second fastener therethrough for fixing said junction box assembly (10),
wherein said mounting feet (140) of said pair of mounting feet (140) are located on diagonally opposite positions of said base (110) of said housing (100); and
wherein said lateral surface of said housing (100) is provided with a drainage protrusion (160) in an unsheared state, said drainage protrusion (160) is configured to be sheared, wherein a drainage hole is provided after shearing said drain protrusion (160) such that said drain protrusion (160) is in a sheared state, for facilitating drainage of fluid within said space of said housing (100).

2. The junction box assembly (10) as claimed in claim 1, wherein said drainage protrusion (160) has a circular cross-section provided with a first center, wherein at least one of said plurality of lateral openings (120) also has a circular cross-section with a second center, wherein said first center and said second center are provided along a plane.

3. The junction box assembly (10) as claimed in claim 1, wherein said drainage protrusion (160) is diametrically opposite of at least one of said plurality of lateral openings (120).

4. The junction box assembly (10) as claimed in claim 1, wherein said first mounting foot of said pair of mounting feet (140) and said second mounting foot of said pair of mounting feet (140) are integrally formed with said base (110).

5. An electrical junction box assembly (10) comprising:
a housing (100) having:
a space for containing an electrical terminal block (200);
a lateral surface surrounding said space;
an operative top opening for placement and removal of said terminal block (200);
a plurality of lateral openings (120) on said lateral surface for allowing insertion of electrical wires to be connected to said terminal block (200);
a base (110) for fixing said terminal block (200); and
a removable and detachable lid (130) for covering said operative top opening of said housing (100);
characterized in that said lateral surface of said housing (100) is provided with a drainage protrusion (160) having an entirely closed end in an unsheared state, said drainage protrusion (160) configured to be sheared, wherein a drainage hole is provided after shearing said drain protrusion (160) such that said drain protrusion (160) is in a sheared state, for facilitating drainage of accumulated fluid within said space of said housing (100).

6. The junction box assembly (10) as claimed in claim 5, wherein said drainage protrusion (160) has a thickness less than a radial width of said protrusion, thereby defining a concave operative inner profile (162) of said drainage protrusion (160).

7. The junction box assembly (10) as claimed in claim 6, wherein maximum thickness along said concave operative inner profile (162) of said drainage protrusion (160) is equal to the thickness of said lateral surface of said housing (100).

8. The junction box assembly (10) as claimed in claim 5, wherein said drainage protrusion (160) is configured to be sheared off by drilling or tapping.

9. The junction box assembly (10) as claimed in claim 5, wherein said junction box assembly (10) includes a drainage valve (164) configured to be fitted on said drainage hole obtained by shearing off said drainage protrusion (160) by drilling or tapping.

* * * * *